(12) United States Patent
Czajkowski et al.

(10) Patent No.: US 11,755,299 B2
(45) Date of Patent: Sep. 12, 2023

(54) METHOD AND APPARATUS FOR FUNCTIONAL UNIT BALANCING AT PROGRAM COMPILE TIME

(71) Applicant: Huawei Technologies Co., Ltd., Shenzhen (CN)

(72) Inventors: Tomasz S. Czajkowski, Toronto (CA); Ehsan Amiri, Richmond Hill (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 143 days.

(21) Appl. No.: 17/355,737

(22) Filed: Jun. 23, 2021

(65) Prior Publication Data
US 2022/0413818 A1    Dec. 29, 2022

(51) Int. Cl.
*G06F 8/41* (2018.01)

(52) U.S. Cl.
CPC .................. *G06F 8/4441* (2013.01)

(58) Field of Classification Search
CPC .................. G06F 8/4441; G06F 9/5083
See application file for complete search history.

(56) References Cited

U.S. PATENT DOCUMENTS

| | | | | |
|---|---|---|---|---|
| 9,965,287 B1* | 5/2018 | McKown | ............ | G06F 9/45533 |
| 2012/0075316 A1* | 3/2012 | Kim | ............ | G06F 8/47 |
| | | | | 345/522 |
| 2012/0324462 A1* | 12/2012 | Miljanic | ............ | G06F 15/7867 |
| | | | | 718/103 |
| 2014/0298346 A1* | 10/2014 | Zakashansky | ........ | G06F 9/5033 |
| | | | | 718/104 |
| 2016/0011857 A1* | 1/2016 | Grover | .................. | G06F 9/4552 |
| | | | | 717/148 |
| 2017/0177313 A1 | 6/2017 | Slesarenko et al. | | |
| 2017/0255496 A1* | 9/2017 | Deng | ................. | G06F 9/4881 |
| 2017/0351493 A1 | 12/2017 | Kintali et al. | | |
| 2019/0370010 A1* | 12/2019 | Iley | .................. | G06F 9/448 |
| 2020/0082273 A1* | 3/2020 | Rossi | .................. | G06F 9/5038 |

FOREIGN PATENT DOCUMENTS

| | | |
|---|---|---|
| CN | 102385524 A | 3/2012 |
| CN | 103631632 A | 3/2014 |
| EP | 1111504 A2 | 6/2001 |

OTHER PUBLICATIONS

J.C. Le Lann and C. Wolinski, "Load Balancing and Functional Unit Assignment in High-Level Synthesis." Proceedings of the SCI'99/ISAS'99, Orlando, Floride, Aug. 1999.

(Continued)

*Primary Examiner* — Wei Y Zhen
*Assistant Examiner* — Amir Soltanzadeh
(74) *Attorney, Agent, or Firm* — Slater Matsil, LLP (57) ABSTRACT

There is provided methods and apparatus to improve runtime by computer programs at compilation time. A compiler analyzes code to be translated into machine executable instructions to identify overloaded functional units of the target processor, and replaces instructions scheduled on the overloaded functional unit to an idle unit using functionally equivalent operations on the idle unit. The replacement instructions may be taken from an instruction replacement library comprising function calls that implement functionality of a functional unit of the target processor on another functional unit of the target processor.

27 Claims, 9 Drawing Sheets

(56) References Cited

OTHER PUBLICATIONS

Riedel, S., Singh, S., Srikumar, V., Rocktäschel, T., Visengeriyeva, L., & Nößner, J. "Wolfe: Strength Reduction and Approximate Programming for Probabilistic Programming." In Workshops at the Twenty-Eighth AAAI Conference on Artificial Intelligence. Jun. 2014.

* cited by examiner

METHOD AND APPARATUS FOR FUNCTIONAL UNIT BALANCING AT PROGRAM COMPILE TIME

FIELD OF THE DISCLOSURE

The present disclosure relates to compilers. Specifically, the present disclosure relates to a method of compiling program code, which achieves run-time improvements by distributing load across different functional units.

BACKGROUND

Software programs are typically created by running source code through compilers, which produce executable code for a given processor architecture. The source code is written in a programming language, which programmers can understand and manipulate, such as C, C++, Assembly language, and others. The compiler transforms the program code into instructions, which can be executed by a processor of a given architecture.

The instructions invoke functional units in the processor for performing various computing tasks. Functional units are hardware modules, which execute instructions for the processor. For example, a processor may have an integer functional unit for performing integer operations such as addition and multiplication. A processor may also have a floating-point unit for performing floating-point operations such as addition and multiplication. Other functional units and other operations are also used.

A plurality of functional units on a processor may perform operations simultaneously, thereby increasing the performance of the processor to reduce runtime.

Each instruction takes a number of clock cycles to complete. In certain processors, instructions may be pipelined. In such cases, a new instruction may be started at each clock cycle, and each instruction currently executed advances one stage at each clock cycle. For example, if an instruction has four stages, four instructions may be executed simultaneously on a functional unit, each of the four instructions being in a different stage.

A compiler is responsible for transforming the program source into instructions while preserving the semantics of the program. In most basic cases, it means that the order of instruction produced by the compiler and the dependencies between the instructions need to match that of the original program. The processor executing the given program will respect the dependencies and when possible leverage features such as pipelining to speed up the execution of the program.

Compilers typically perform an intermediary transformation of the source code into an Intermediate Representation (IR) of the source code, prior to transforming the IR into machine-readable instructions. The IR is generally more readable to a person than assembly code. IR instructions map to a specific functional unit of the processor. IR instructions may be mapped directly to machine-readable instructions, or may be mapped to functions in a library which implement the functionality of individual IR instructions with one or more machine-readable instructions. IR may comprise a high-level or a low-level representation of the instructions to be executed by the processor.

Compilers have been designed to optimize source code for more rapid execution of the compiled program. Various strategies have been developed to reduce the runtime of a program, while ensuring that the functionality intended by the source code is performed faithfully. These strategies may involve modifying the steps of the program significantly, however the result of each step should be preserved.

In particular, compilers have been designed to produce code, which makes efficient use of a target processor's resources. Such resources may include load store units, arithmetic and logic units, floating-point units, caches, and others. By creating executable code which is designed to efficiently use a target processor's resources, compilers have produced programs that execute faster.

Compilers need to have knowledge of the mapping between an operation to be performed from the source code, and the functional units of the target processor. For example, if the source code indicates that a multiplication is to be performed on a floating-point value, the compiler knows that this operation may be performed on a floating-point functional unit of the target processor. Depending on the inputs or the output of the operation in question, the compiler can choose to schedule the execution of that operation on a particular functional unit of the target processor.

Compilers may analyze the source code at the level of a basic block. A basic block of instructions is a set of instructions that are always performed sequentially without branching. A basic block may terminate with a branch instruction to another basic block, or with the end of the program. Within a basic block, if one instruction is executed, all instructions of the basic block must be executed.

SUMMARY

It is an object of the present disclosure to provide an improved method for compiling source code into executable instructions.

In a first aspect, there is provided a method at a computing device for compiling source code. The computing device selects an instruction from the source code, and determines a first functional unit on which the instruction is generally performed. The computing device then determines whether the first functional unit is currently overloaded. When the functional unit is overloaded, the code is transformed to replace the selected instruction with replacement instructions. The replacement instructions are selected to be performed on a different functional unit. Once the code has been transformed, the code may be converted to executable instructions. The replacement instructions are selected to perform an equivalent function to the selected instruction.

In a second aspect, there is provided a computing device for compiling source code. The computing device comprises at least a processor, an interface, a memory, and a communication bus to allow components to communicate. A program stored in memory, when invoked, causes the processor of the computing device to select an instruction from the source code, and determine a first functional unit on which the instruction is generally performed. The program then causes the computing device to determine whether the first functional unit is currently overloaded. When the functional unit is overloaded, the code is transformed to replace the selected instruction with replacement instructions. The replacement instructions are selected to be performed on a different functional unit. Once the code has been transformed, the code may be converted to executable instructions. The replacement instructions are selected to perform an equivalent function to the selected instruction.

In a third aspect, there is provided a computer-readable medium comprising executable code for execution by a processor of a computing device. The executable code comprises instructions for causing the computing device to select an instruction from the source code, and determine a first functional unit on which the instruction is generally performed. The computing device then determines whether the first functional unit is currently overloaded. When the functional unit is overloaded, the code is transformed to replace the selected instruction with replacement instructions. The replacement instructions are selected to be performed on a different functional unit. Once the code has been transformed, the code may be converted to executable instructions. The replacement instructions are selected to perform an equivalent function to the selected instruction When functional units are overloaded, runtime gains may be achieved by performing equivalent operations in parallel on a different functional unit. These equivalent operations may be scheduled at compile time.

According to a first implementation according to any of the first aspect, the second aspect, or the third aspect, the load balancing code transformation may be performed on Intermediate Representation (IR) data, and may be performed after other code optimization transformations are applied.

According to a second implementation according to any of the first aspect, the second aspect, or the third aspect, the computing device identifies replacement instructions which are suitable for the selected instructions by looking up a table of replacement instructions. The table may be associated to the target processor and comprise replacement instructions for at least some of the instructions of the target processor instruction set.

According to a third implementation according to any of the first aspect, the second aspect, or the third aspect, the computing device determines if using the replacement instructions is beneficial over using the selected instruction. The step of determining whether using the replacement instructions is beneficial may use any one of the following techniques, either individually, or in combination, and in any order. The first scenario is the case where the replacement instructions are used, and the second scenario is the case where the original instruction is used.

In one technique for determining if using the replacement instructions is beneficial, a basic block under the first scenario is run through a scheduling module and a basic block under the second scenario is also run through the scheduling module. If the scheduling of first scenario is superior to the scheduling of the second scenario, the replacement is performed.

In another technique for determining if using the replacement instructions is beneficial, the computing device determines that the instruction is not on a critical path of the cluster of instructions.

In another technique for determining if using the replacement instructions is beneficial, the ratio of utilization of the first functional unit under the first scenario is compared to the ratio of utilization of the first functional unit under the second scenario. The replacement instructions are deemed to be beneficial when the ratio for the first scenario is lower than the ratio for the second scenario.

In another technique for determining if using the replacement instructions is beneficial, the computing device determines that the second functional unit is not overloaded under the first scenario.

The present disclosure therefore provides for an improved method of compiling code, in which code which relies heavily on some functional units while leaving other units idle is transformed to perform some operations of the heavily used functional units on the idle functional units, thereby achieving runtime gains by the compiled program.

A library of replacement instructions for a given target processor allow to achieve the same functionality on different functional units.

According to at least another aspect, there is provided an apparatus comprising a compiler, the compiler comprising a compiler front-end module, a code optimizer module, a load balancer module, and a compiler back-end module. The compiler front-end module is programmed to convert source code into IR, the code optimizer module is programmed to apply code optimizing transformations to the IR. The code optimizer module may comprise the load balancer module. Alternatively, the load balancer module may be applied after the code optimizer module. The load balancer module is programmed to transform the IR to balance the load across different functional units as described herein. The load balancer module may comprise an evaluator module programmed to evaluate the effect of replacing an instruction with replacement instructions. The compiler back-end module is programmed to convert the optimized and load-balanced IR into executable instructions.

BRIEF DESCRIPTION OF THE DRAWINGS

The present disclosure will be better understood with reference to the drawings in which.

DETAILED DESCRIPTION

Figure 1:
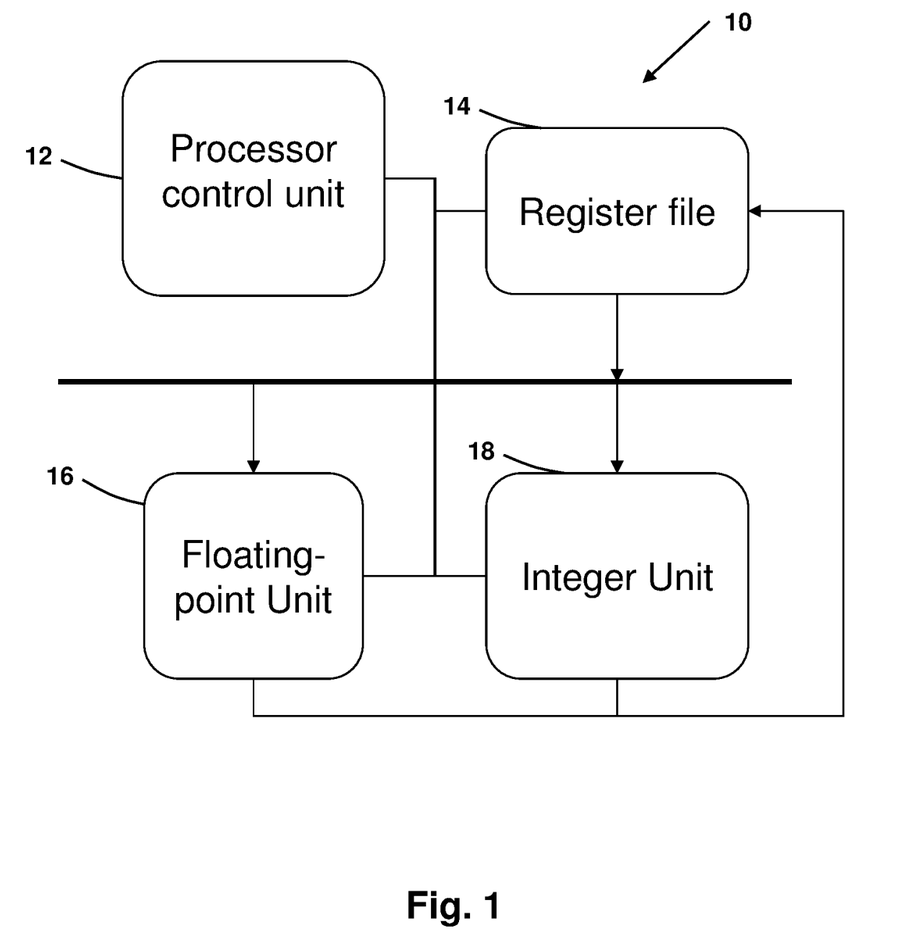
FIG. 1 is a block diagram illustrating a processor according to at least one embodiment of the present disclosure.

Reference is made to FIG. 1, which shows a simplified diagram of a processor 10.

Processor 10 comprises a control unit 12 which is responsible, amongst other things, for fetching instructions from memory and directing the execution of instructions by invoking other units of the processor 10. Such other units may comprise floating-point unit 16, and integer unit 18, for example. Processor 10 further comprises register file 14 which comprises registers used for reading and writing data.

A computation may be written in source code as follow:

float $a=x+y+z+w$;

Where "float" is a type declaration for variable "a", indicating a floating point, and a is computed as the sum of x, y, z, and w.

Because 'a' is a floating point, a conventional compiler will translate this source code as:

fadd $r_0, r_1, r_2$
fadd $r_0, r_0, r_3$
fadd $r_0, r_0, r_4$, where fadd is a mnemonic for the floating-point addition instruction. The mnemonic is followed by operands, in this case a destination and two sources. The operands $r_x$ represent a register. The values of x, y, z, and w are placed in registers $r_1$, $r_2$, $r_3$, and $r_4$, respectively. The first fadd operation adds the value of registers $r_1$ and $r_2$ and places the result in $r_0$. Then the value of $r_3$ is added to that total, and so is the value of $r_4$.

In this example, each operation is performed one after the other, because each operation uses fadd, which invokes the floating-point unit 16 of the processor 10. The integer unit 18 of the processor 10 remains unused. This represents a suboptimal use of resources and a loss of runtime efficiency. It would be preferable to perform operations simultaneously, or in parallel, when possible.

As seen from the example above, conventional compilers may under-utilize available resources leading to sub-optimal runtime for applications. More specifically, applications with mostly floating-point operations under-utilize the integer unit 18, and applications with mostly integer operations under-utilize the floating-point unit 16. While floating-point functional units and integer functional units are used as examples throughout this disclosure, the present disclosure is applicable to any functional unit on a processor.

Some techniques have been developed to address this issue. In particular, J. C. Le Lann, C. Wolinski, *Load Balancing and Functional Unit Assignment in High-Level Synthesis, Proceedings of the SCI'99/ISAS'99*, Orlando, Florida, August 1999, teaches to balance load between functional units of the same type. For example, when a processor has multiple floating-point units, or multiple integer units, Le Lann et al. teaches load balancing between each of the floating-point units, and load balancing between each of the integer units. However, Le Lann et al. does not teach load balancing between, for example, a floating-point unit and an integer unit.

Sebastian Riedel, Sameer Singh, Vivek Srikumar, Larysa Visengeriyeva, *WOLFE: Strength Reduction and Approximate Programming for Probabilistic Programming, International Workshop on Statistical Relational AI (StarAI)*, 2014, teaches to replace brute-force operator implementations with equivalent but more efficient versions. However, Riedel et al. does not consider that it may be preferable to perform a less efficient operation on an otherwise unused functional unit than a more efficient operation on a functional unit which is fully used.

Therefore, prior art compilers may schedule too many operations on a few functional units while leaving other functional units idle. In other words, current compilers fail to properly distribute computing load across their functional units. Specifically, current compilers may produce executable code which schedules operations successively on the same functional unit, not due to constraints of the source code, but due to a lack of resources on the target processor, even while some functional units of the target processor remain idle.

Accordingly, prior art compilers produce inefficient code by failing to identify this load imbalance between functional units, and by failing to modify the executable code they produce in order to remedy this load imbalance.

According to the present disclosure, a more efficient use of processor resources is promoted by load balancing across different types of functional units. Specifically, load analysis is performed at compilation time and the compiler uses functional libraries to invoke under-utilized functional units of various types. The functional libraries allow the compiler to replace an operation or a sequence of operations with a different sequence of operations that produces the same outcome on a different functional unit.

Therefore, the present disclosure provides for an improved compiler comprising a load balancer. The load balancer performs analysis of the code to identify instances where a functional unit is overloaded while other units are idle, and modifies the code to unload some tasks from the overloaded functional unit to idle functional units.

Figure 2:
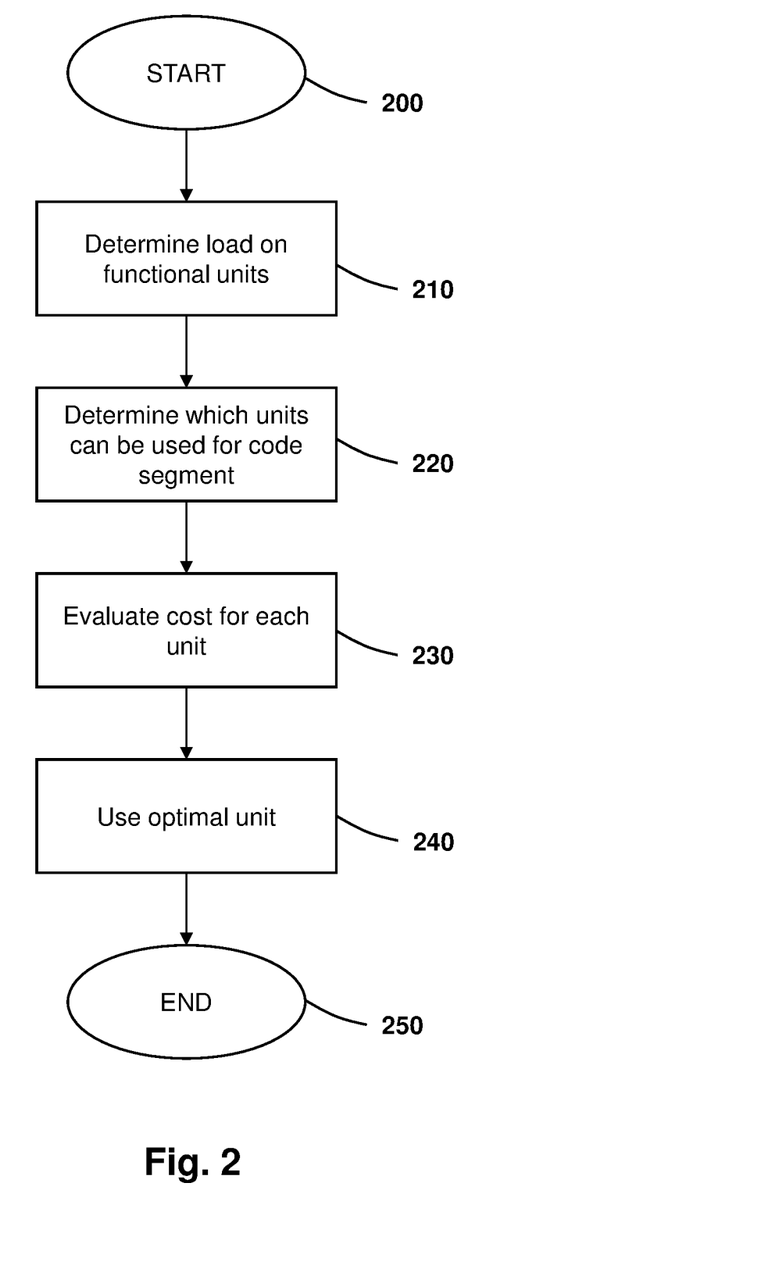
FIG. 2 is a flow diagram illustrating a method according to at least one embodiment of the present disclosure.

Reference is made to FIG. 2 which illustrates a method according to at least one embodiment of the present disclosure.

The method starts at block 200 and proceeds to block 210 in which a segment of code is analyzed. Specifically, the segment of code is analyzed to determine computational load on each unit of the processor. As will be appreciated, the compiler performing the method of FIG. 2 is aware of the architecture of the processor for which the source code is being compiled. This includes knowledge of each functional unit within the processor.

The segment of code being analyzed can be used to determine the load on each unit based on the operations suggested by the segment of code, as shall be described in greater detail below.

When it is determined that a functional unit is overutilized compared to others within a code segment, the method proceeds to block 220 in which other functional units that can be used for the code segment are identified. For example, when the code segment requires a lot of floating-point operations, other functional units than the floating-point unit may be capable of performing such operations with a function from a functional library. Therefore, at block 220, the compiler may perform a lookup of its functional libraries to determine whether some operations may be performed using a functional library and an underused functional unit.

For example, the functional library may include a function for performing a floating-point addition on an integer functional unit. Similarly, the functional library may include a function for performing an integer addition on a floating-point unit. Other combinations of operations and functional units are contemplated within the present disclosure.

Therefore, at block 220, under-utilized functional units which can be used to implement a code segment are identified.

Once these functional units are identified, the method proceeds to block 230 in which the cost of using the identified functional units is determined. In at least one embodiment, the cost is determined based on required processor clock cycles. However, other means of determining costs are also contemplated by the present disclosure.

The method then proceeds to block 240 in which the optimal functional unit is selected. As will be appreciated, to select a functional unit in this context means to compile the source code segment into computer-readable instructions which invoke the selected functional unit. In some cases, this may involve mapping a source code segment to computer-readable instructions conventionally, or may involve mapping the source code segment to a function of a functional library as discussed above.

Once a functional unit is selected the method proceeds to block 250 and ends. The method of FIG. 2 may be repeated for all code segments of the source code.

Figure 3A:
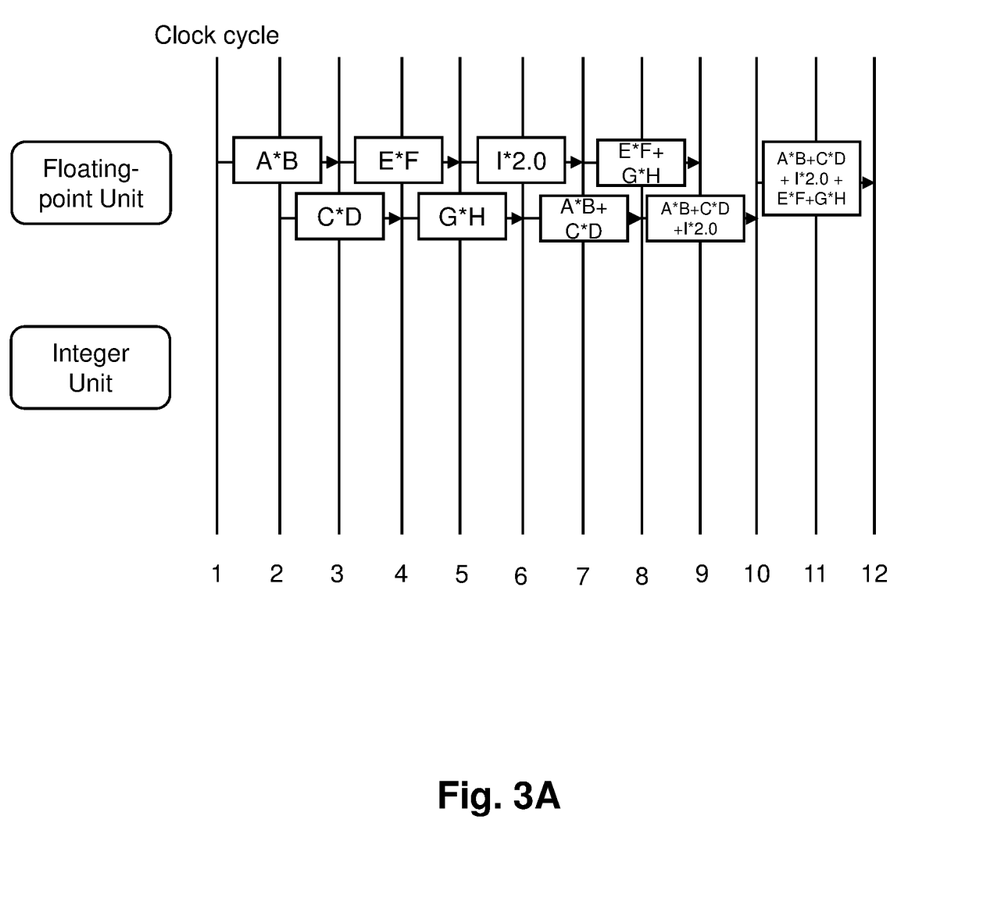
FIG. 3A is a scheduling diagram for a processor according to at least one embodiment of the present disclosure.
Figure 3B:
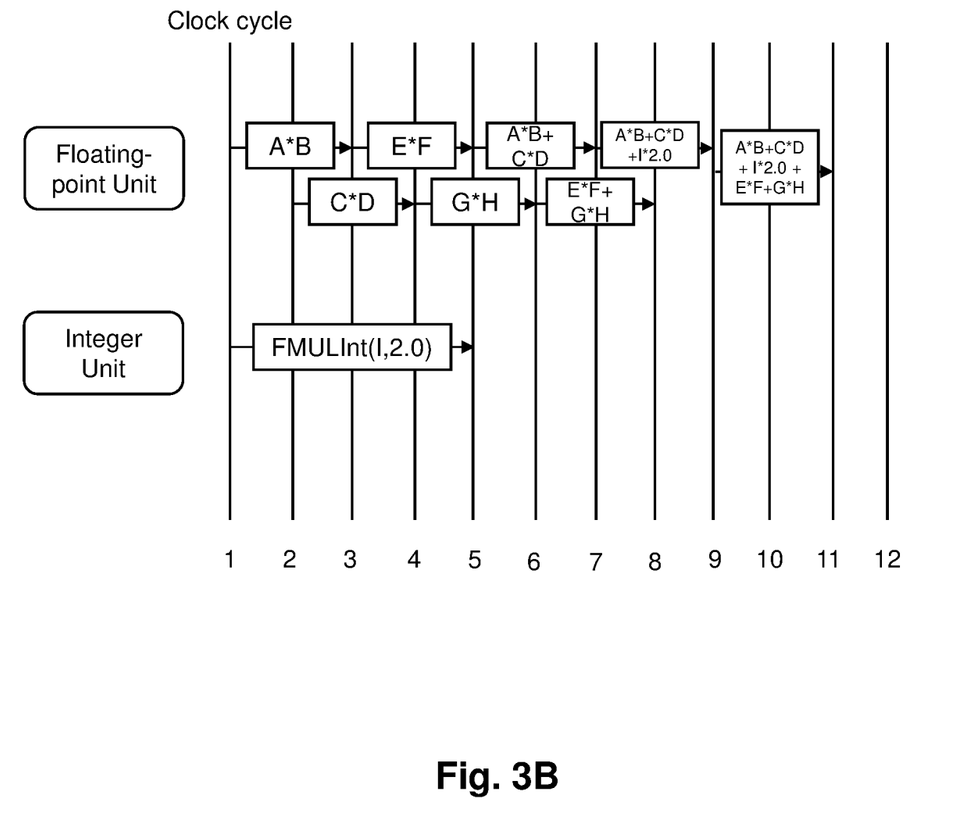
FIG. 3B is a scheduling diagram for a processor according to at least one embodiment of the present disclosure.

Reference is now made to FIG. 3A and FIG. 3B, which illustrate how making use of functional libraries to balance load across functional units is beneficial.

FIGS. 3A and 3B both illustrate how to compile the following line of source code:

float $X=A*B+C*D+E*F+G*H+I*2.0$;

Each of the variables A, B, C, D, E, F, G, H, and I are floating points. In this example, the following assumptions are made: floating-point operations such as multiplication and addition take two clock cycles; operations can be pipelined; one floating-point and one integer operation can be scheduled for each clock cycle; and multiplications involving a power of 2 may be implemented on an integer functional unit using the function FMULInt, which takes four clock cycles.

In FIG. 3A, the line of code is compiled conventionally, making use of only the floating-point unit, because all operations are floating-point operations. Operation A*B is scheduled at clock cycle 1, followed by operation C*D, E*F, G*H, and I*2.0. Because operations can be pipelined, operation C*D is scheduled at clock cycle 2, E*F is scheduled at clock cycle 3, G*H is scheduled at clock cycle 4, and I*2.0 is scheduled at clock cycle 5.

At clock cycle 6, the results of A*B and C*D are known, as these operations take two clock cycles and were completed at clock cycles 3 and 4, respectively. Therefore, the operation A*B+C*D is scheduled for cycle 6.

At clock cycle 7, the results of E*F and G*H are known, as these operations take two clock cycles and were completed at clock cycles 5 and 6, respectively. Therefore, the operation E*F+G*H is scheduled for cycle 7.

At clock cycle 8, the operation A*B+C*D is completed, and therefore the operation A*B+C*D+I*2.0 is scheduled for cycle 8.

At clock cycle 9, the operation E*F+G*H is completed, but the operation A*B+C*D+I*2.0 is not, as this operation was scheduled for clock cycle 8 and takes two clock cycles. Therefore, no operation is scheduled for clock cycle 9.

At clock cycle 10, the operation A*B+C*D+I*2.0 is completed, and therefore the operation of A*B+C*D+I*2.0+E*F+G*H may be scheduled at clock cycle 10 to complete at clock cycle 12.

Therefore, as seen from the above, compiling the source code conventionally results in the execution of the machine-readable instructions in 12 clock cycles.

Turning now to FIG. 3B, illustrating how operations may be scheduled according to at least one embodiment of the present disclosure, by making use of otherwise unused functional units and functional libraries.

Specifically, the code segment $$\text{float } X = A*B + C*D + E*F + G*H + I*2.0;$$

is analyzed to identify opportunities of performing operations on functional units which are under-utilized. As discussed with respect to FIG. 3A, this code segment is conventionally executed only on floating-point units. Therefore, it may be beneficial to identify operations which may be performed on a different functional unit, such as for example the integer functional unit.

In this case, the operation I*2.0 is a multiplication with a power of 2, which can be executed on an integer functional unit with the function FMULInt, which takes 4 cycles to execute. As this operation is not dependent on any other operations, it may be scheduled on the integer functional unit at clock cycle 1, and its result will be available at clock cycle 5.

The other operations may be scheduled on the floating-point functional unit. Specifically, operation A*B is scheduled at clock cycle 1, followed by operation C*D at clock cycle 2, operation E*F at clock cycle 3, and operation G*H at clock cycle 4.

At clock cycle 5, operations A*B and C*D are completed, and A*B+C*D can be scheduled. At clock cycle 6, operations E*F and G*H are completed, and E*F+G*H can be scheduled.

At clock cycle 7, operation FMULInt(I, 2.0) is completed and operation A*B+C*D+I*2.0 can be scheduled.

At clock cycle 8, operation E*F+G*H is completed but A*B+C*D+I*2.0 is not. Therefore, no operation is scheduled for clock cycle 8.

At clock cycle 9, operation A*B+C*D+I*2.0 is completed, and operation A*B+C*D+I*2.0 can be scheduled. As this operation takes 2 clock cycles, it will be completed at clock cycle 11.

Therefore, in FIG. 3B the same source code is executed in 11 clock cycles instead of 12 as in FIG. 3A. This represents a run-time improvement of 8.3%. Notably, the same improvement could have been achieved even if the FMULInt operation took up to 6 cycles to complete, as the result of that operation was not used until clock cycle 7.

The executable instructions used for FIG. 3A, expressed in assembly language, are as follows, where FMUL is a floating-point multiplication, FADD is a floating-point addition, and RX indicates a register:

FMUL R0 A B
FMUL R1 C D
FMUL R2 E F
FMUL R3 G H
FMUL R4 I 2.0
FADD R0 R0 R1
FADD R2 R2 R3
FADD R0 R0 R4
FADD R0 R0 R2

The executable instructions used for FIG. 3B, expressed in assembly language, are as follows:

FMULInt R4 I 2.0
FMUL R0 A B
FMUL R1 C D
FMUL R2 E F
FMUL R3 G H
FADD R0 R0 R1
FADD R2 R2 R3
FADD R0 R0 R4
FADD R0 R0 R2

The above is provided as an example and is not to be limiting.

In some cases it is beneficial to replace operations of a functional unit with a function call on a different functional unit, and in some cases, it is not beneficial. Load balancing analysis may be performed prior to replacing operations to identify instances where the replacement is beneficial. In cases where the load on a functional unit is heavy, it is beneficial to replace some operations by invoking another functional unit. In cases where the load on the functional unit is light, it is preferable to keep using the same functional unit.

Therefore, according to at least some embodiments of the present disclosure, load balancing is performed in order to estimate the impact of replacing floating-point operations by invoking the integer functional unit. In some cases, the impact may be zero, for example if the rest of the computation must wait for the result of the operation in question. The impact may be negative, for example if the integer unit is also subject to a heavy load. However, in some cases the impact may be positive.

By replacing some floating-point operations only when the impact is deemed to be positive, significant run-time benefits may be achieved.

When performing load analysis, the following principles have been found to produce beneficial results.

Any operation can be transformed. If an operation is typically performed on a first functional unit, and the first functional unit is very busy, and a different functional unit can be used, it is beneficial to use the different functional unit.

The subject of the transformation has a branch-free alternate implementation. If the transformation of one operation to another requires the introduction of control flow operations that were not present prior to the transformation, the transformation will have a negative impact and should be avoided.

The alternate implementation should not use the same functional unit. The benefits obtained by the present method are based on using functional units which would otherwise be idle while other functional units are busy. Accordingly, transforming an operation to a new operation which uses the same functional unit as before does not provide such benefits.

The original functional unit must be fully used at the time of the operation. Transforming an operation to a new operation is useful if it frees up a scheduling slot which would otherwise be occupied, and allows another operation to be scheduled in that slot, thereby reducing total runtime.

Figure 4:
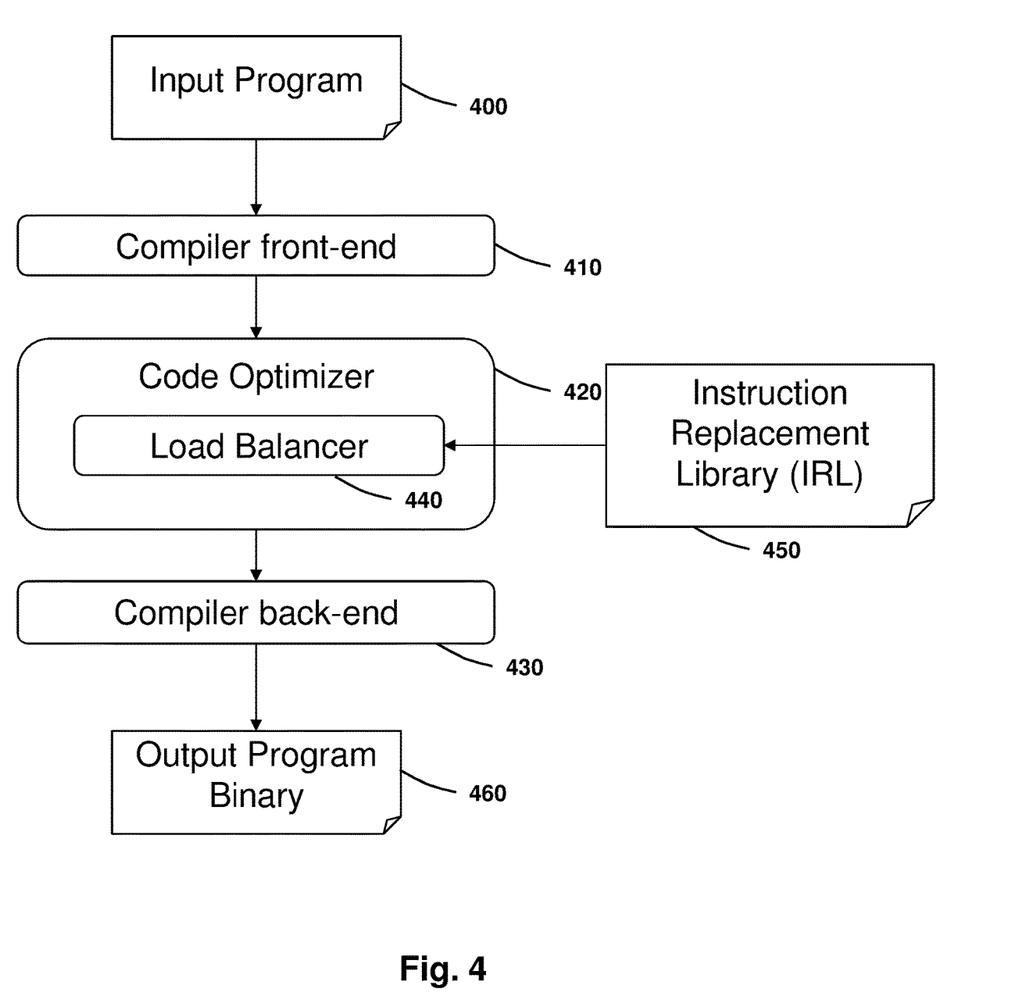
FIG. 4 is a flow diagram of a method of compiling source code according to at least one embodiment of the present disclosure.

Reference is now made to FIG. 4.

FIG. 4 is a flow diagram illustrating a method according to at least one embodiment of the present disclosure. The input program 400 is provided to the compiler front end module at block 410. Input program 400 may comprise source code written in C, C++, Pascal, or other programming languages.

The compiler front end module takes in source code and produces Intermediate Representation (IR) of the program. The IR maps instructions to functional units, while being more readable to a human programmer than machine-executable code.

The IR is then passed to the code optimizer module 420. The code optimizer module 420 may perform various transformations to the code. According to at least some embodiments of the present disclosure, the code optimizer module 420 comprises load balancer module 440.

Load balancer module 440 has access to Instruction Replacement Library (IRL) 450. IRL 450 includes a plurality of functions which are implemented on various functional units of the processor for which the compilation is being performed. For example, IRL 450 may include a function such as FMULInt, described above with respect to FIG. 3B. Generally, IRL 450 comprises functions which implement functionality of a first functional unit on a different functional unit. For each function in the IRL 450, the load balancer module 440 has access to information such as the number of clock cycles required to execute the function.

Load balancer module 440 may then perform load analysis based on the IR for each of the functional units, and when a functional unit is under a heavy load, some of the operations that were destined for a functional unit according to the IR may be redirected to a different functional unit by using functions in the IRL.

Therefore, the load balancer 440 transforms the IR into a more optimized version of the code prior to translation of the IR into machine readable instructions. Once load balancer 440 completed its task, the optimized and load-balanced IR is passed to compiler back end module 430. If other forms of optimizations are performed after the load balancer transformed the code, care must be taken by the other optimization procedures to not lose the benefits achieved by load balancing.

Compiler backend module 430 then transforms the optimized IR into machine executable instructions 460.

Generally, better results are obtained by performing load balancing later in the process rather than earlier. Therefore, according to at least some embodiments of the present disclosure, the load balancer module 440 may be applied by the compiler back-end module 430, after the code optimizer module 420 has transformed the IR.

As the load balancer achieves gains by scheduling operations on otherwise idle functional units, other optimizing transformations should be applied before load balancing. Specifically, accurate knowledge of when operations are scheduled is needed to successfully perform load balancing, and optimizing transformations applied after load balancing could potentially modify the code in a manner which reduces the benefit obtained from load balancing.

Figure 5:
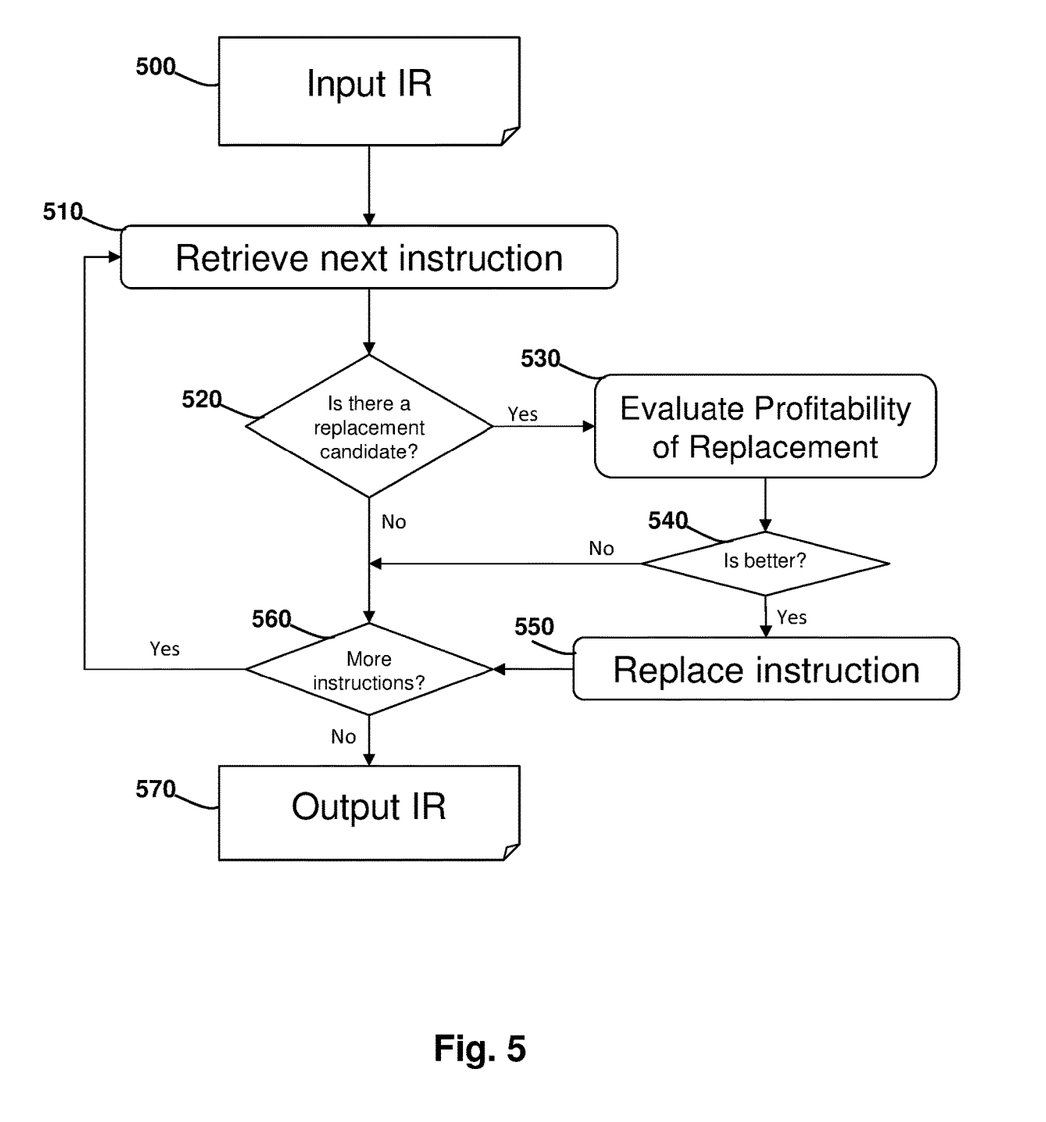
FIG. 5 is a flow diagram of a method according to at least one embodiment of the present disclosure.

Reference is now made to FIG. 5, which shows in detail the operation of the load balancer.

The load balancer receives the input IR 500. The input IR 500 may be IR that has been optimized with other techniques already, or may be IR that has been translated from the source code without further transformations.

At block 510, the load balancer retrieves the next instruction to be processed from the IR. The method then proceeds to block 520 to determine whether the instruction could be replaced by a function from an IRL. In one embodiment, the load balancer performs a lookup in the IRL to identify one or more potential replacements. The IRL for a given target processor may therefore include a look-up table comprising an entry for each instruction in the instruction set of the target processor, where each entry includes a list of potential replacement operations. For some entries within the table, the list may be empty, indicating no replacement operations are available for the corresponding instruction.

If there are no potential replacements, the method proceeds to block 560 to determine whether there are further instructions to process. If so, the method returns to block 510 to retrieve the next instruction, and outputs the transformed IR at block 570 otherwise.

When at least one replacement is identified, the profitability of each potential replacement is evaluated at block 530. The profitability may be performed by an evaluator module. The profitability of a potential replacement may be evaluated using a model or can be computed by comparing different scheduling scenarios, and the resulting runtime.

The method than proceeds to block 540. If the potential replacement is not considered profitable, the method proceeds to block 560 to determine whether there are further instructions to process. Otherwise, if the potential replacement is profitable, the method proceeds from block 540 to block 550 where the code is transformed to replace the original instruction with replacement instructions.

The method then proceeds to block 560 to determine whether there are further instructions to process.

In the embodiment illustrated by FIG. 5, the evaluation of potential replacement is performed in a specific order, and the decision to replace an instruction is performed at most once for each instruction. In at least some other embodiments, the instructions to replace may be identified using a set of heuristics. Other approaches are also intended to be within the scope of the present disclosure.

Dependency between instructions may also be considered when evaluating the profitability of a potential replacement. For example, instructions in the longest dependency chain should not be replaced unless the replacement takes fewer cycles. Specifically, if an instruction is to be replaced with a function from an IRL which takes more clock cycles than the instruction, the output of that function should not be needed for other operations prior to the last clock cycle required for the execution of that function. This is illustrated with respect to FIGS. 3A and 3B, above, where the function FMULInt takes 4 clock cycles but the output is not needed until clock cycle 7. Had the output been needed before clock cycle 5, operations would have been delayed and the runtime negatively affected.

According to at least one embodiment, the profitability of a potential replacement may be evaluated by scheduling the replacement into candidate code and determine the effect on run time. However, running a scheduler algorithm for every potential replacement is expensive computationally.

According to at least one embodiment, the profitability of a potential replacement may be evaluated by estimating the occupancy of each functional unit, such as for example the floating-point unit and the integer unit. The occupancy may be measured by chains of operation assigned to each unit. For example, if an operation can be scheduled in parallel of a potential replacement on a given functional unit, this indicates that the functional unit is heavily occupied. In turn, when a functional unit is heavily occupied, this indicates that the replacement is likely profitable.

As seen with respect to FIG. 3B, by scheduling the operation FMULInt on the integer unit, another operation was scheduled on the floating-point unit at a clock cycle that would have normally been used up by the multiplication of I and 2.0. This allows the operation of A*B+C*D to be scheduled at clock cycle 5 instead of clock cycle 6 as seen in FIG. 3A.

Determining the profitability of a potential replacement by estimating the occupancy of functional units is not as exact running the scheduler, but is less expensive computationally.

Figure 6:
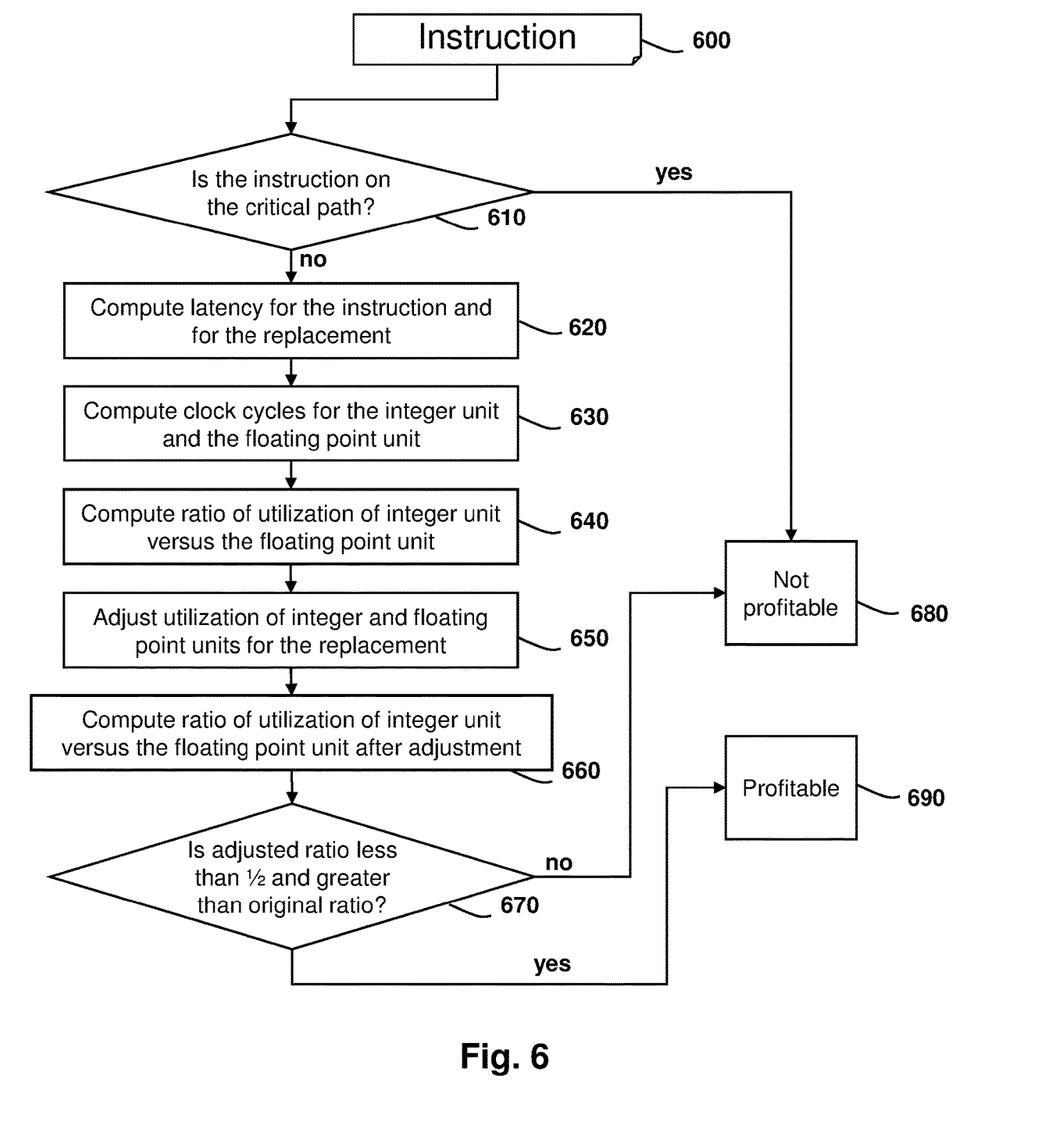
FIG. 6 is a flow diagram of a method according to at least one embodiment of the present disclosure.

Reference is now made to FIG. 6, which illustrates a method for determining the profitability of replacing an instruction with a function call from an IRL according to at least one embodiment.

According to this non-limiting embodiment, an instruction 600 is received and at block 610, it is determined whether the instruction is on the critical path. The critical path, for a given cluster of instructions, consists of the longest sequence of operations in the block of code. An operation may be on the critical path, or the operation may be on a branch that is operating in parallel to the critical path. The cluster of instructions may be provided as a parameter or may be computed at block 610 as a Directed Acyclic Graph (DAG).

Figure 7:
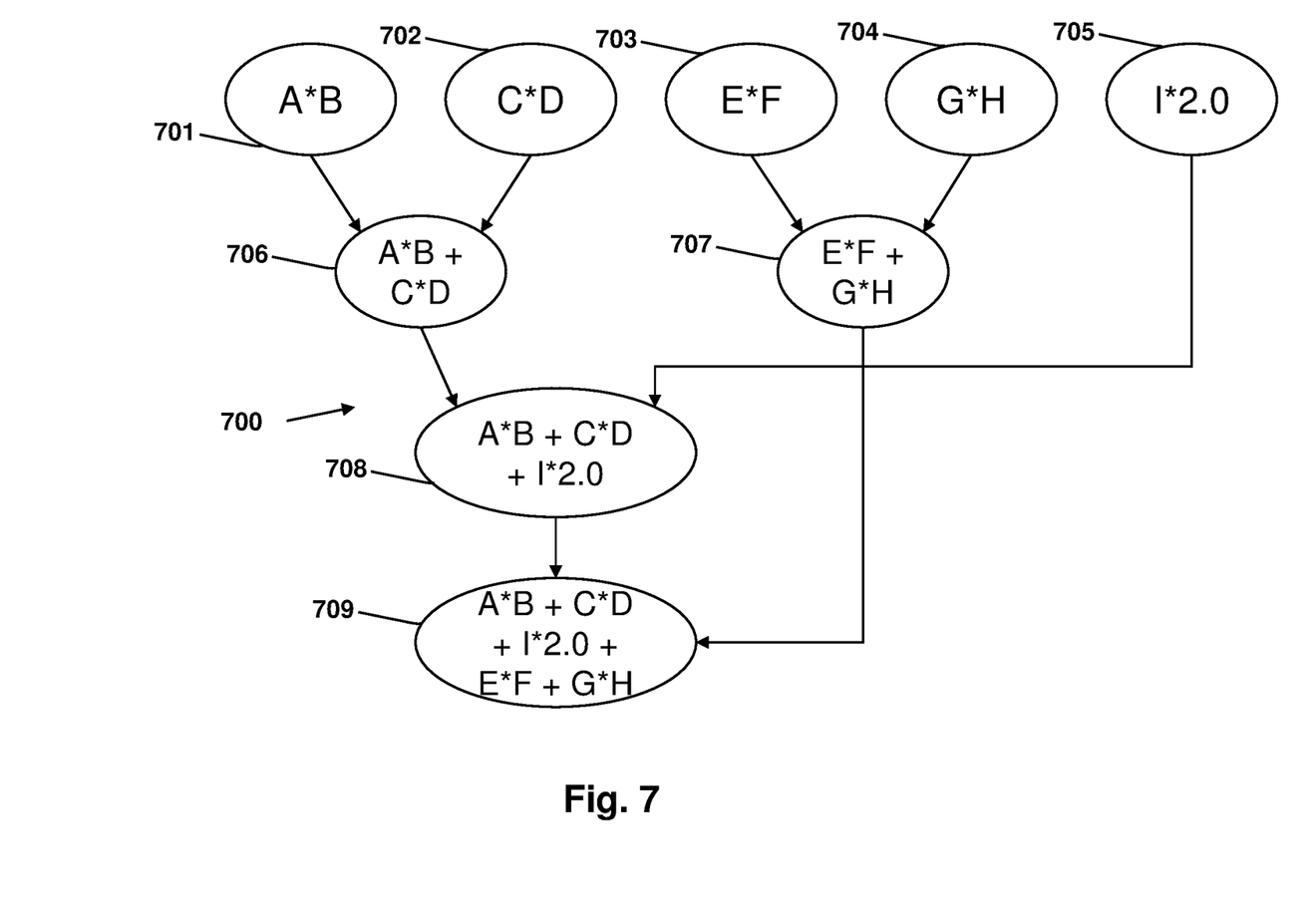
FIG. 7 is an example of a Direct Acyclic Graph (DAG) used to determine a critical path.

The notion of a critical path is illustrated with respect to FIG. 7, which uses as the basis for an example, the same line of source code discussed above, namely float $X=A*B+C*D+E*F+G*H+I*2.0$.

As seen in FIG. 7, the above line of source code is represented by a Directed Acyclic Graph (DAG). Each operation is represented by a vertex, and dependencies between operations are represented by a directional edge between the vertices. Specifically, operations 701, 702, 703, 704, and 705 have no dependencies and can be performed at any time. Operation 706 depends on operations 701 and 702, and operation 707 depends on operations 703 and 704. Operation 708 depends on operations 706 and 707, and operation 709, depends on operation 705 and 708.

The critical path is the longest path. In this case, there are two possible paths of length 3, namely path 701-706-708-709 and path 702-706-708-709. Each of these may be considered the critical path, or they may both be considered the critical path.

In some embodiments, the critical path is the longest path in terms of latency. In this embodiment, the graph 700 may be modified to associate with each edge of the graph 700 a value corresponding to the number of clock cycles needed for the operation of the vertex from which the edge originates. The critical path is then the path for which the total of values associated with the edges of the path is the greatest.

Returning now to FIG. 6, if an instruction is on the critical path as determined at block 610, replacing the operation is deemed unprofitable at block 680. In particular, replacement instructions generally require more clock cycles to execute than the original instruction, as the original instruction is executed on a functional unit specifically designed to perform that operation. Therefore, if an instruction is on the critical path, replacing it will make the critical path longer and have a negative effect on performance.

However, if the operation is not on the critical path, the method proceeds to block 620, where the latency for the operation and the latency for a potential replacement for the operation are computed. The latency may be computed in clock cycles.

The method proceeds to block 630 in which the number of clock cycles required of the integer functional unit for the block of code, and the number of clock cycles required of the floating-point functional unit for the block of code, are determined. In this case, the block of code may be a line of source code such as float $X=A*B+C*D+E*F+G*H+I*2.0$.

In particular, the block of code comprises instruction 600 but generally comprises other instructions which either depend from instruction 600 or from which instruction 600 depends.

The method proceeds to block 640, in which the ratio of utilization of the integer unit versus utilization of the floating-point unit is computed. Then the method proceeds to block 650, in which the number of clock cycles required of each functional unit under the replacement scenario is calculated. This can be done by adding the number of clock cycles for the replacement operation to the number of clock cycles already required for the integer functional unit, and by subtracting the number of clock cycles for instruction 600 from the number of clock cycles already required for the floating-point unit.

The method proceeds to block 660 to compute the utilization ratio of the functional units based on the replacement scenario, based on the values calculated at block 650.

The method then proceeds to block 670 to determine whether the replacement is profitable based on the calculated ratios. For example, in one embodiment, if the ratio of utilization of the integer unit for the original operation is greater than the ratio of utilization of the integer unit for the replacement operation, and the ratio of utilization of the integer unit for the replacement operation is less than 50%, the replacement is deemed profitable, and not profitable otherwise. Other ways of determining profitability of the replacement from these ratios are also contemplated.

The method of FIG. 6 relies on the observation that replacing floating-point operations with integer operations is generally profitable until the load on integer units becomes as great as the load on the floating-point unit. However, depending on the number of functional units and integer units on a given processor, different utilization thresholds may be used. For example, if a processor has one floating-point unit and two integer units, replacing a floating-point operation may be profitable even at 66% integer unit utilization.

The above may be implemented using Instruction Replacement Libraries (IRL), which comprise function calls used to replace operations on a busy functional unit with one or more operations on a less busy functional unit.

According to at least some embodiments of the present disclosure, functions in an IRL consist of a branch free sequence of instructions which implement a functionality. In particular, IRL functions should be as efficient as possible, so as to provide greater run time benefits.

For a given IRL function designed to replace an operation on a specific functional unit, no operation of that function should take place on the specific functional unit.

Different IRLs may be designed for different target processors. Specifically, an IRL is designed in consideration of the different functional units available on the target processor, and the number of clock cycles required for each type of operation on the target processor.

According to at least some embodiments, the IRL is stored in a two-dimensional table, where one dimension represents functional units, and the other dimension represents instructions. In each entry of the table, there may be stored a list of replacement instructions corresponding to a given functional unit and instruction. For example, the table may store in entry i,j, the function FMULInt discussed above, where i is the index for the floating-point unit, and j is the index for the multiplication operation. As discussed above, FMULInt implements the floating-point multiplication on the integer functional unit, but other replacement instructions implemented on other functional units may also be stored in entry i,j.

For some processors, replacing operations as described above may be less advantageous when considering the cost of moving values from one register bank to another. For example, some processors may have register banks for the floating-point functional unit and register banks for the integer functional unit, and moving data between these registers may consume clock cycles.

In other cases, for processors with the ability to quickly materialize constants, the above method is particularly advantageous.

The above-described method therefore provides for advantageously optimizing code for greater run time efficiency by leveraging unused functional units of the processor where available. Therefore, the above-described method may improve program run times without adding extra functional units to a processor or any changes to the hardware of a computing device.

In particular, the above-described method leverages the ability to perform more expensive operations on unused functional units instead of cheaper operations on busy functional units to improve runtime. The unused functional unit need not correspond to the busy functional unit other than having the ability to execute an equivalent function to the instruction being replaced.

Figure 8:
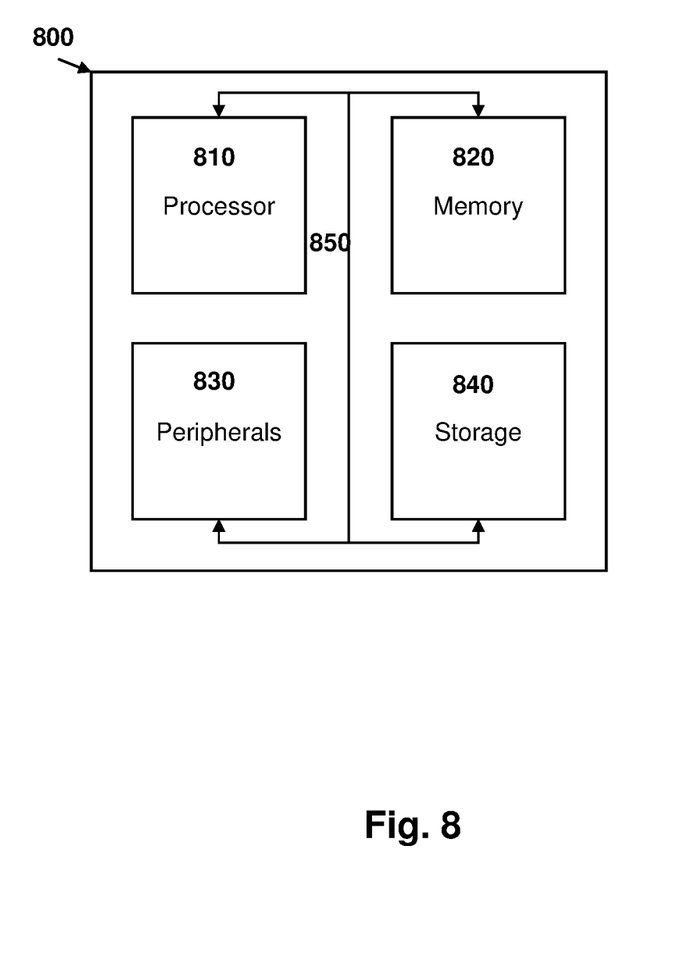
FIG. 8 is a block diagram of a computing device for implementing embodiments of the present disclosure.

The above functionality may be implemented on any one or combination of computing devices. FIG. 8 is a block diagram of a computing device 800 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The computing device 800 may comprise a central processing unit (CPU) 810, memory 820, a mass storage device 840, and peripherals 830. Peripherals 830 may comprise, amongst others one or more input/output devices, such as a speaker, microphone, mouse, touchscreen, keypad, keyboard, printer, display, network interfaces, and the like. Communications between CPU 810, memory 820, mass storage device 840, and peripherals 830 may occur through one or more buses 850.

The bus 850 may be one or more of any type of several bus architectures including a memory bus or memory controller, a peripheral bus, video bus, or the like. The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs.

The mass storage device 840 may comprise any type of storage device configured to store data, programs, and other information and to make the data, programs, and other information accessible via the bus. The mass storage device 840 may comprise, for example, one or more of a solid state drive, hard disk drive, a magnetic disk drive, an optical disk drive, or the like.

The computing device 800 may also include one or more network interfaces (not shown), which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network, for data processing and communications with remote devices, such as other processing units, the Internet, remote storage facilities, or the like.

Through the descriptions of the preceding embodiments, the teachings of the present disclosure may be implemented by using hardware only or by using a combination of software and hardware. Software or other computer executable instructions for implementing one or more embodiments, or one or more portions thereof, may be stored on any suitable computer readable storage medium. The computer readable storage medium may be a tangible or in transitory/non-transitory medium such as optical (e.g., CD, DVD, Blu-Ray, etc.), magnetic, hard disk, volatile or non-volatile, solid state, or any other type of storage medium known in the art.

Additional features and advantages of the present disclosure will be appreciated by those skilled in the art.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Moreover, the previous detailed description is provided to enable any person skilled in the art to make or use one or more embodiments according to the present disclosure.

Various modifications to those embodiments will be readily apparent to those skilled in the art, and the generic principles defined herein may be applied to other embodiments without departing from the spirit or scope of the teachings provided herein. Thus, the present methods, systems, and or devices are not intended to be limited to the embodiments disclosed herein. The scope of the claims should not be limited by these embodiments, but should be given the broadest interpretation consistent with the description as a whole. Reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims.

Furthermore, nothing herein is intended as an admission of prior art or of common general knowledge. Furthermore, citation or identification of any document in this application is not an admission that such document is available as prior art, or that any reference forms a part of the common general knowledge in the art. Moreover, nothing disclosed herein is intended to be dedicated to the public regardless of whether such disclosure is explicitly recited in the claims.

The invention claimed is:

1. A method for compiling source code, comprising:
   selecting an instruction from the source code;
   determining a first functional unit on which the instruction is to be performed;
   determining that the first functional unit is overloaded;
   determining that replacement instructions are beneficial over the instruction, wherein the determining that the replacement instructions are beneficial over the instruction comprises:
      evaluating a first scenario in which a cluster of instructions comprises the replacement instructions, and
      evaluating a second scenario in which the cluster of instructions comprises the instruction;
   after the determining that the replacement instructions are beneficial over the instruction, transforming the source code by replacing the instruction with the replacement instructions to generate transformed source code, the replacement instructions being selected to be performed on a second functional unit; and
   converting the transformed source code into machine-executable instructions,
   wherein the replacement instructions are functionally equivalent to the instruction.

2. The method of claim 1, further comprising:
   prior to the selecting:
      transforming the source code into Intermediate Representation (IR) format; and
      transforming the source code using a code optimizer.

3. The method of claim 1, further comprising:
   identifying at least one set of replacement instructions, the identifying comprising looking up a table of replacement instructions.

4. The method of claim 3, wherein the table is for a target processor, the table comprising an entry for instructions of an instruction set of the target processor.

5. The method of claim 1, wherein the first functional unit is distinct from the second functional unit.

6. The method of claim 1, wherein the cluster of instructions is a basic block, and the evaluating the first scenario comprises:
   scheduling the basic block under the first scenario and scheduling the basic block under the second scenario.

7. The method of claim 1, wherein the determining that the replacement instructions are beneficial over the instruction comprises:
   determining that the instruction is not on a critical path of the cluster of instructions.

8. The method of claim 1, wherein the evaluating the first scenario comprises:
   calculating a first ratio of utilization of the first functional unit under the first scenario, and evaluating the second scenario comprises calculating a second ratio of utilization of the first functional unit under the second scenario; and determining that the replacement instructions are beneficial when the first ratio is less than the second ratio.

9. The method of claim 1, further comprising:
   determining that the replacement instructions are beneficial when the second functional unit is not overloaded under the first scenario.

10. A computing device for compiling source code, comprising:
    at least one processor; and
    a memory storing executable code that, when executed by the at least one processor, cause the computing device to perform operations including;
    selecting an instruction from the source code;
    determining a first functional unit on which the instruction is to be performed;
    determining that the first functional unit is overloaded;
    determining that replacement instructions are beneficial over the instruction, wherein the determining that the replacement instructions are beneficial over the instruction comprises:
       evaluating a first scenario in which a cluster of instructions comprises the replacement instructions, and
       evaluating a second scenario in which the cluster of instructions comprises the instruction;
    after the determining that the replacement instructions are beneficial over the instruction, transforming the source code by replacing the instruction with the replacement instructions to generate transformed source code, the replacement instructions being selected to be performed on a second functional unit; and
    converting the transformed source code into machine-executable instructions,
    wherein the replacement instructions are functionally equivalent to the instruction.

11. The computing device of claim 10 the operations further comprising:
    prior to the selecting:
       transforming the source code into Intermediate Representation (IR) format; and
       transforming the source code using a code optimizer.

12. The computing device of claim 10, the operations further comprising:
    identifying at least one set of replacement instructions, the identifying comprising looking up a table of replacement instructions.

13. The computing device of claim 12, wherein the table is for a target processor, the table comprising an entry for instructions of an instruction set of the target processor.

14. The computing device of claim 10, wherein the first functional unit is distinct from the second functional unit.

15. The computing device of claim 10, wherein the cluster of instructions is a basic block, and the evaluating the first scenario comprises:

scheduling the basic block under the first scenario and scheduling the basic block under the second scenario.

16. The computing device of claim 10, wherein the determining that the replacement instructions are beneficial over the instruction comprises:
determining that the instruction is not on a critical path of the cluster of instructions.

17. The computing device of claim 10, wherein the evaluating the first scenario comprises:
calculating a first ratio of utilization of the first functional unit under the first scenario, and evaluating the second scenario comprises calculating a second ratio of utilization of the first functional unit under the second scenario; and determining that the replacement instructions are beneficial when the first ratio is less than the second ratio.

18. The computing device of claim 10, further comprising:
determining that the replacement instructions are beneficial when the second functional unit is not overloaded under the first scenario.

19. A non-transitory computer-readable medium comprising executable code for execution by a computing device, the executable code comprising executable instructions that cause the computing device to perform operations, the operations including:
selecting an instruction from source code;
determining a first functional unit on which the instruction is to be performed;
determining that the first functional unit is overloaded;
determining that replacement instructions are beneficial over the instruction, wherein the determining that the replacement instructions are beneficial over the instruction comprises:
evaluating a first scenario in which a cluster of instructions comprises the replacement instructions, and evaluating a second scenario in which the cluster of instructions comprises the instruction;
after the determining that the replacement instructions are beneficial over the instruction, transforming the source code by replacing the instruction with the replacement instructions to generate transformed source code, the replacement instructions being selected to be performed on a second functional unit; and
converting the transformed source code into machine-executable instructions,
wherein the replacement instructions are functionally equivalent to the instruction.

20. The non-transitory computer-readable medium of claim 19, the operations further comprising:
prior to the selecting:
transforming the source code into Intermediate Representation (IR) format; and
transforming the source code using a code optimizer.

21. The non-transitory computer-readable medium of claim 19, the operations further comprising:
identifying at least one set of replacement instructions, the identifying comprising looking up a table of replacement instructions.

22. The non-transitory computer-readable medium of claim 21, wherein the table is for a target processor, the table comprising an entry for instructions of an instruction set of the target processor.

23. The non-transitory computer-readable medium of claim 19, wherein the first functional unit is distinct from the second functional unit.

24. The non-transitory computer-readable medium of claim 19, wherein the cluster of instructions is a basic block, and the evaluating the first scenario comprises:
scheduling the basic block under the first scenario and scheduling the basic block under the second scenario.

25. The non-transitory computer-readable medium of claim 19, wherein the determining that the replacement instructions are beneficial over the instruction comprises:
determining that the instruction is not on a critical path of the cluster of instructions.

26. The non-transitory computer-readable medium of claim 19, wherein the evaluating the first scenario comprises:
calculating a first ratio of utilization of the first functional unit under the first scenario, and evaluating the second scenario comprises calculating a second ratio of utilization of the first functional unit under the second scenario; and determining that the replacement instructions are beneficial when the first ratio is less than the second ratio.

27. The non-transitory computer-readable medium of claim 19, the operations further comprising:
determining that the replacement instructions are beneficial when the second functional unit is not overloaded under the first scenario.

* * * * *